United States Patent

[11] 3,575,376

| [72] | Inventor | Carl D. Arvidson, Jr.<br>Simsbury, Conn. |
|---|---|---|
| [21] | Appl. No. | 771,958 |
| [22] | Filed | Oct. 30, 1968 |
| [45] | Patented | Apr. 20, 1971 |
| [73] | Assignee | Thiokol Chemical Corporation<br>Bristol, Pa. |

[54] DUAL POSITION VALVE
8 Claims, 7 Drawing Figs.

[52] U.S. Cl. ................................................ 251/31,
251/160, 251/301
[51] Int. Cl. .................................................... F16k 5/20,
F16k 25/00
[50] Field of Search ............................................ 251/298,
160—163, 31, 301

[56] References Cited
UNITED STATES PATENTS

| 1,171,189 | 2/1916 | Arandi | 251/298 |
| 2,574,428 | 11/1951 | Wheatley | 251/163 |
| 2,833,511 | 5/1958 | Fletcher | 251/160X |
| 3,306,571 | 2/1967 | Bussi et al. | 251/160X |

FOREIGN PATENTS

| 1,184,986 | 2/1959 | France | 251/163 |

*Primary Examiner*—Arnold Rosenthal
*Attorney*—William R. Wright, Jr.

ABSTRACT: A valve is presented in which the single poppet initially seats on an upstream port and thereafter seats on a downstream port, but in which undesirable wiping of the seal by the poppet as it seats and unseats is minimized. Valves of this sort are particularly useful in rocket propellant supply systems in order to initially isolate propellants from the valve interior.

CARL D. ARVIDSON, JR.
INVENTOR.

CARL D. ARVIDSON, JR.
INVENTOR.

CARL D. ARVIDSON, JR.
INVENTOR.

CARL D. ARVIDSON, JR.
INVENTOR.

BY
AGENT

DUAL POSITION VALVE

BACKGROUND OF THE INVENTION

The present invention relates to fluid flow shutoff valves and relates, more particularly, to an improved valve for the propellant systems of rocket motors.

The propellant supply lines associated with rocket motors are called upon to carry fluids which are often very corrosive in nature, often combust or react when contact is made with other fluids due to hypergolicity or to catalysis and, in general, do not lend themselves easily to contamination or to possible leakage or seepage. It is, therefore, desirable to keep the propellant away from as many parts of the system as possible at least until such time as the system is put in operation so that problems of the above sort will not arise at least during the storage period prior to use. The valve body cavity itself is preferably isolated from the propellant during this period and it therefore becomes desirable to effect a seal at the upstream side of the valve body cavity. This is ordinarily accomplished by providing a poppet and seat at that point but this means that a heavy structure capable of exerting great force must be utilized in order to reclose the valve since the considerable force exerted by the flowing propellant must be overcome as the poppet is forced upstream onto its seat. The present invention solves this problem by providing a valve having both an upstream and downstream seat with the poppet seating on the upstream seat during the original closed or storage condition and seating on the downstream seat in the reclosed condition of the system. This results in a structure which is lighter in weight because the valve reclosure is effected as the poppet moves to its seat with the flowing stream and not against it and thus much less force is required for the reclosure and a much lighter structure can be built with a resultant saving in weight and expense. The present invention also solves another important problem which is common to valves having spherically faced poppets which usually rotate at the axis of the spherical face and drag the face across the seat until the valve is opened. This results in wear, scratching and general disruption of the valve seat and its sealing means with the result that the seal is soon rendered useless for further sealing. The present invention provides a structure which, while it does not entirely eliminate this wiping effect, greatly reduces it and considerable extends the effective life of the seal. This is accomplished in the present invention by the employment of several axes of rotation of the spherically faced poppet as described in detail later in this specification, which as the valve opens results in movement of the face away from the seat as well as across it thus almost eliminating any wiping action.

It is, therefore, an object of the present invention to provide a valve adapted to open and shut off a flowing stream of highly pressurized fluid without the need for a heavy and complex high-strength structure to effect reclosure thereof.

It is also an object of the present invention to provide a valve of the foregoing type which is adapted to be initially closed substantially at its upstream entrance and reclosed substantially at its downstream exit so that a structure of less weight, complexity and strength is required than would be the case if the closure means had to be forced upstream against the flow to reclose the valve on its upstream entrance.

It is also an object of the present invention to provide a valve of the foregoing type in which wiping or scraping of the seal by the poppet is greatly reduced.

Figure 1:
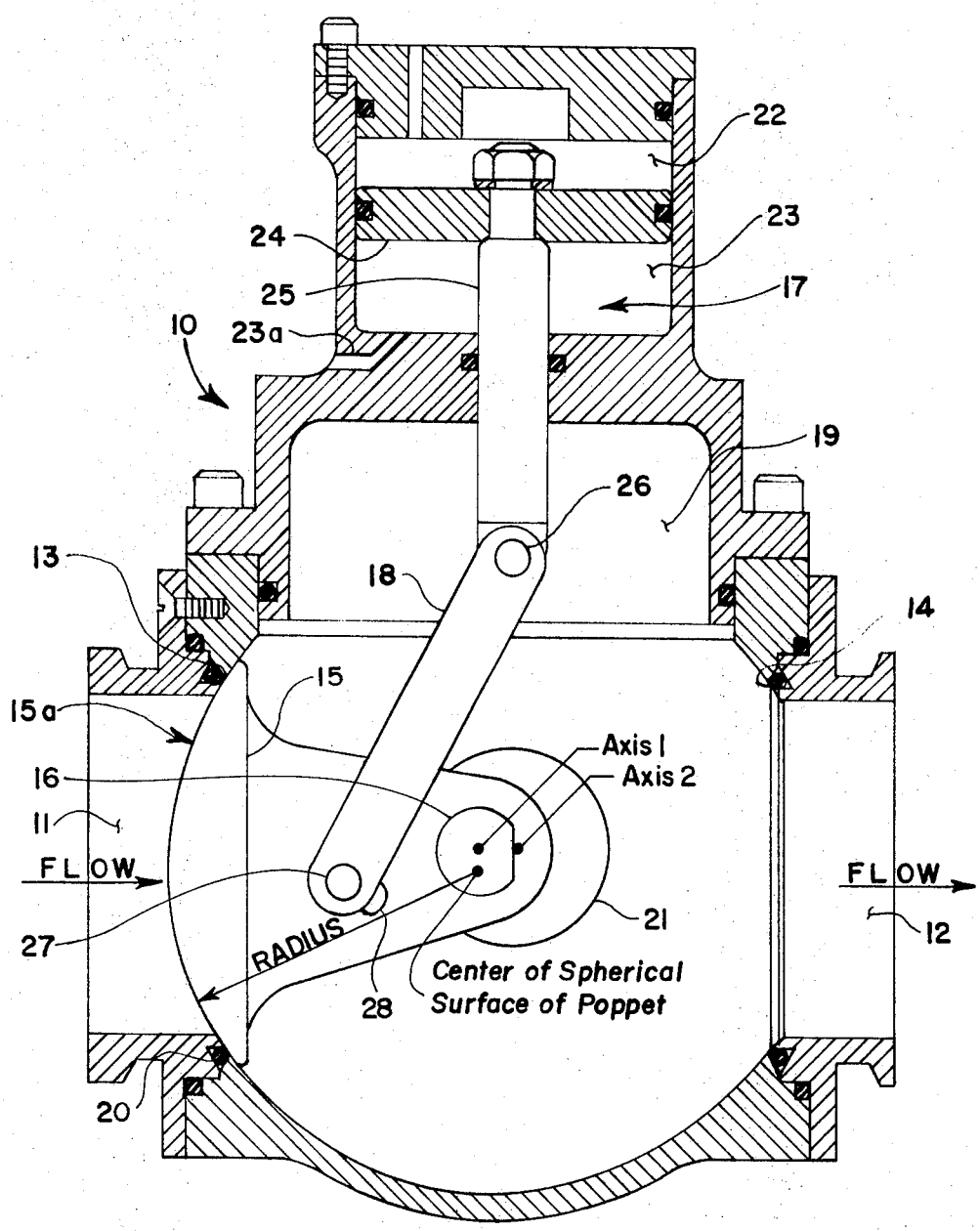
FIG. 1 is a cross-sectional front view of the valve showing the poppet closing the upstream port.
Figure 4:
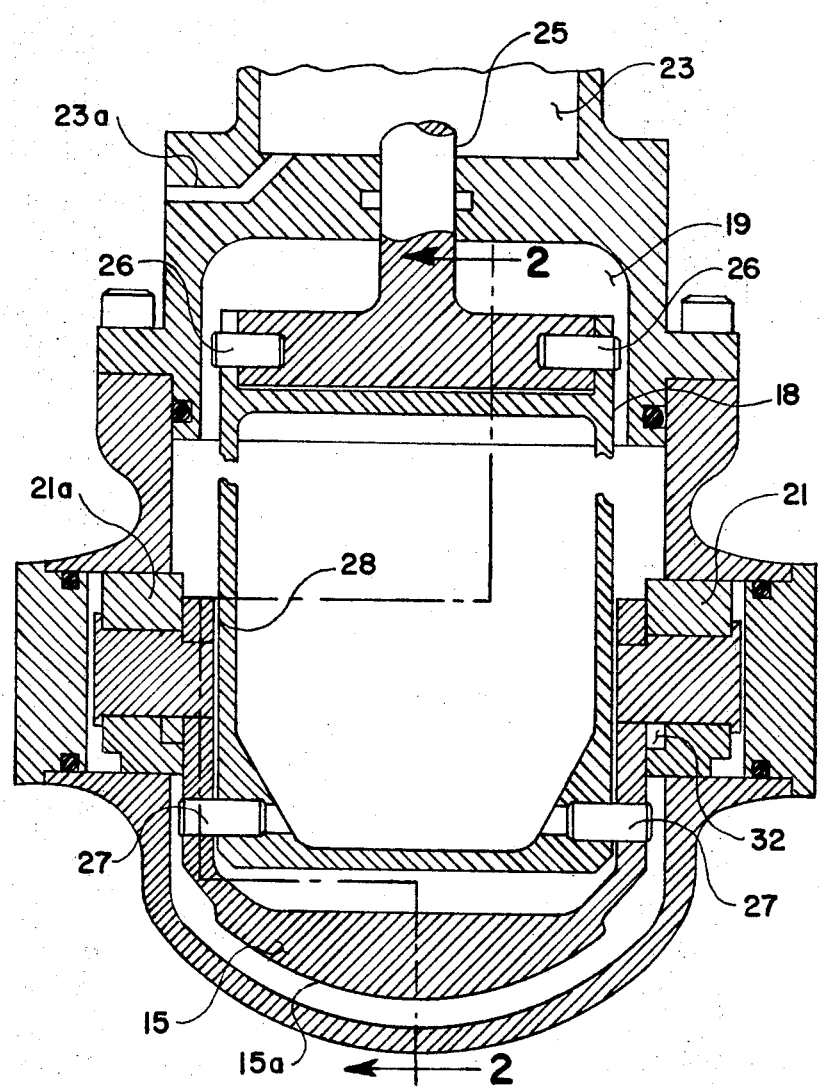
FIG. 4 is a cross-sectional end view of the valve showing it in the fully open condition with the poppet in the position shown in FIG. 2.

With reference to FIG. 1, the valve is preferably comprised of a body generally designated by the numeral 10, although it may actually be constructed of a number of pieces, a downstream port 11, an upstream port 12, circular seats 13, and 14, for ports 11, and 12 respectively, a poppet 15, a poppet pivot shaft 16, an actuator generally designated by numeral 17 and link 18 connecting poppet 15 with actuator 17, and a valve chamber 19. As will be seen from the drawing, poppet 15 has a spherical segment face 15a which bears upon seat 13 generally and in particular upon O-ring 20 to form a fluid-tight seal at that point. Poppet 15 is pivoted at its opposite end by means of pivot shaft 16 which is journaled eccentrically in bushing 21 with bushing 21 itself journaled for 90° rotation in body 10 as shown (particularly in FIG. 4). It is important that the center of the spherical segment face not be coincident with the axis of rotation of the pivot shaft 16 for reasons to be explained later herein and that it be below it at the outset as shown in FIG. 1. Bushing 21 is circular in cross section and is itself rotatable through 90° about its own central axis, hereinafter known as the bushing axis, or axis 2, but does not rotate until a desired point in the sequence of opening and reclosing the valve is reached as will also be described in detail later in this specification.

In operation, and with reference to FIG. 1, hydraulic fluid under pressure is admitted to chamber 22 above piston 24 of actuator 17 thus moving the piston and its attached piston rod 25 downward and exerting a substantially downward force on poppet 15 through link 18 and pivot pins 26 and 27. Trapped fluid in chamber 23 flows out through vent hole 23a. This force causes poppet 15 to rotate about pivot journal 28 one fourth of a turn in a counterclockwise direction to the position shown in FIG. 2, thus opening the inlet port 11 and permitting fluid to flow from the supply conduit (not shown) into the valve body cavity 19 and out the outlet 12. Poppet 15 rotates about its pivotal axis 1 which is the central axis of journal pin 16 but this axis 1 is not the locus of the center of the spherical face of poppet 15 which is shown directly below the pivotal axis in FIG. 1 and a short distance from it. As will be seen from a perusal of FIGS. 1 and 2, poppet 15 not only rotates downwardly in a counterclockwise direction but its face will also move away from seat 13, thus removing it from further contact with seat 13 and preventing wiping of it except only in the very early initial period of rotation of poppet 15 due to the following tendency of the resilient seal ring 20. The rotation of poppet 15 continues until it reaches the position shown in FIG. 2 (i.e. downward) wherein the valve is shown in its fully open condition. Axis 1 remains in its initial location.

Figures 5, 6, 7:
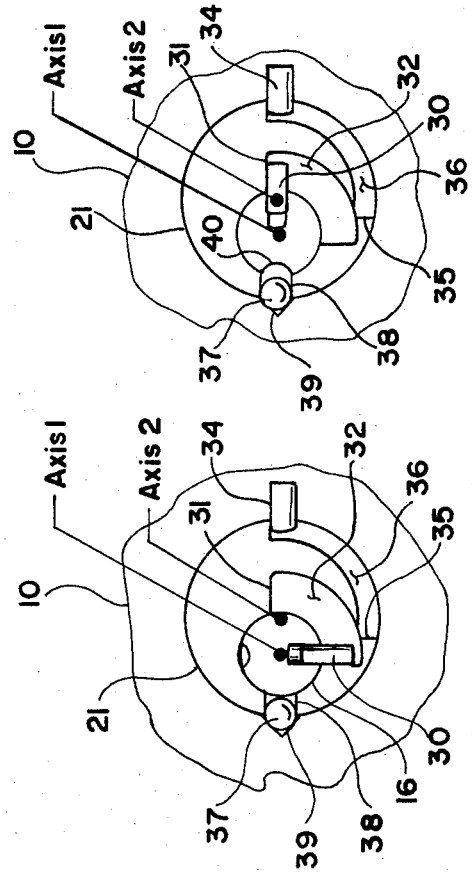
FIG. 5 is a view of the poppet shaft and bushing and their associated mechanism for shifting the rotational axis of the poppet shaft as it appears with respect to FIG. 1.
FIG. 6 is a view similar to FIG. 5 except that the mechanism is shown as it appears with respect to FIG. 2.
FIG. 7 is a view similar to FIG. 6 except that the mechanism is shown as it appears with respect to FIG. 3.

When it is desired to stop the flow and to reclose the valve, hydraulic fluid pressure is vented from chamber 22 and is applied to chamber 23 below piston 24 forcing it and its attached piston rod 25 upward and thus exerting an upward pull on link 18 and its upper and lower pivot pins 26, 27. As pivot pin 27 moves upwardly it slides in overcenter slot 28 (see FIGS. 1, 2 and 3) until it reaches the end of its travel therein after which it starts to rotate poppet 15 upward in a counterclockwise direction about pin 16. As it does so bushing 21 is also made to rotate 90° counterclockwise in the valve body 10 under the urging of shaft pin 30 (see FIG. 6) as it bears upon surface 31 of arcuate slot 32 in bushing 21 as shown in FIGS. 5 and 6. Further rotation is prevented by pin 34 as it strikes against surface 35 of slot 36 in bushing 21 (see FIG. 7). As a result of the rotation of bushing 21, journal pin 16 passes in a circular arc to a new location with its central axis directly below the central axis of bushing 21 as shown in FIG. 7. This action meanwhile, locates poppet 15 in place on seat 14 of port 12, resting on O-ring seal 33 and flow through the valve is prevented. The overcenter slot 28 prevents the occurrence of any dead center position which might interfere with the action.

Figure 2:
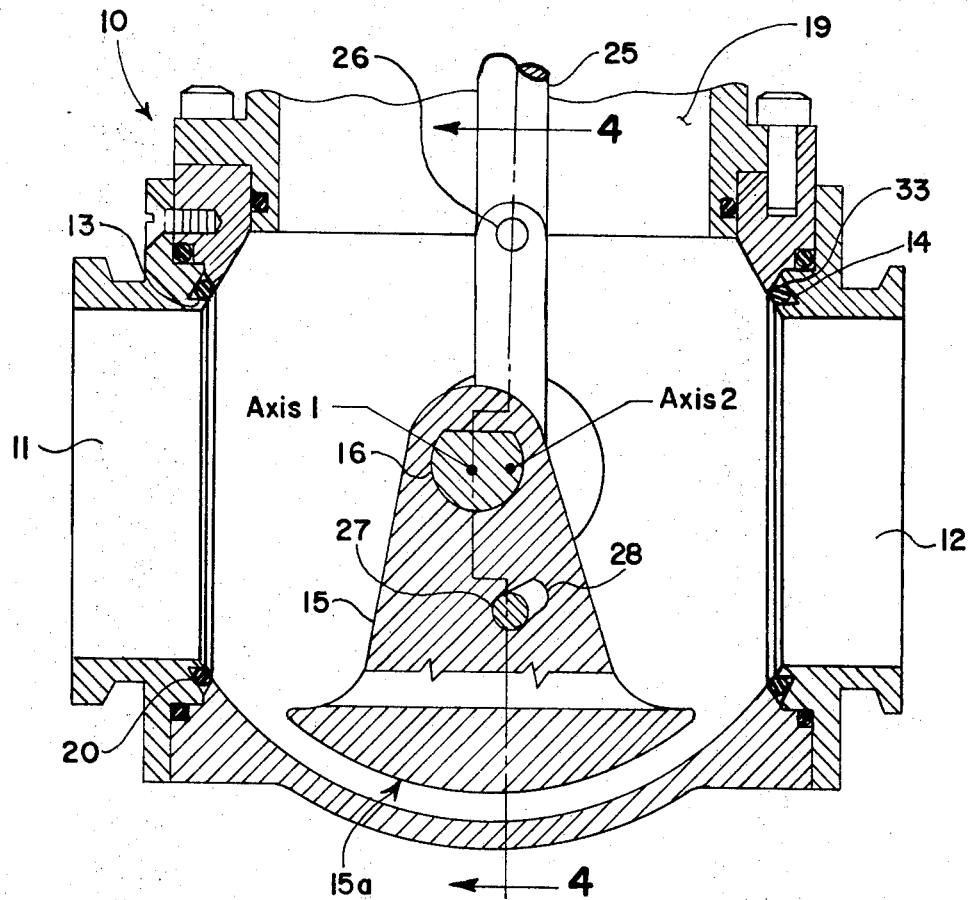
FIG. 2 is a partial cross-sectional front view of the lower portion of the valve showing it in its fully open condition.
Figure 3:
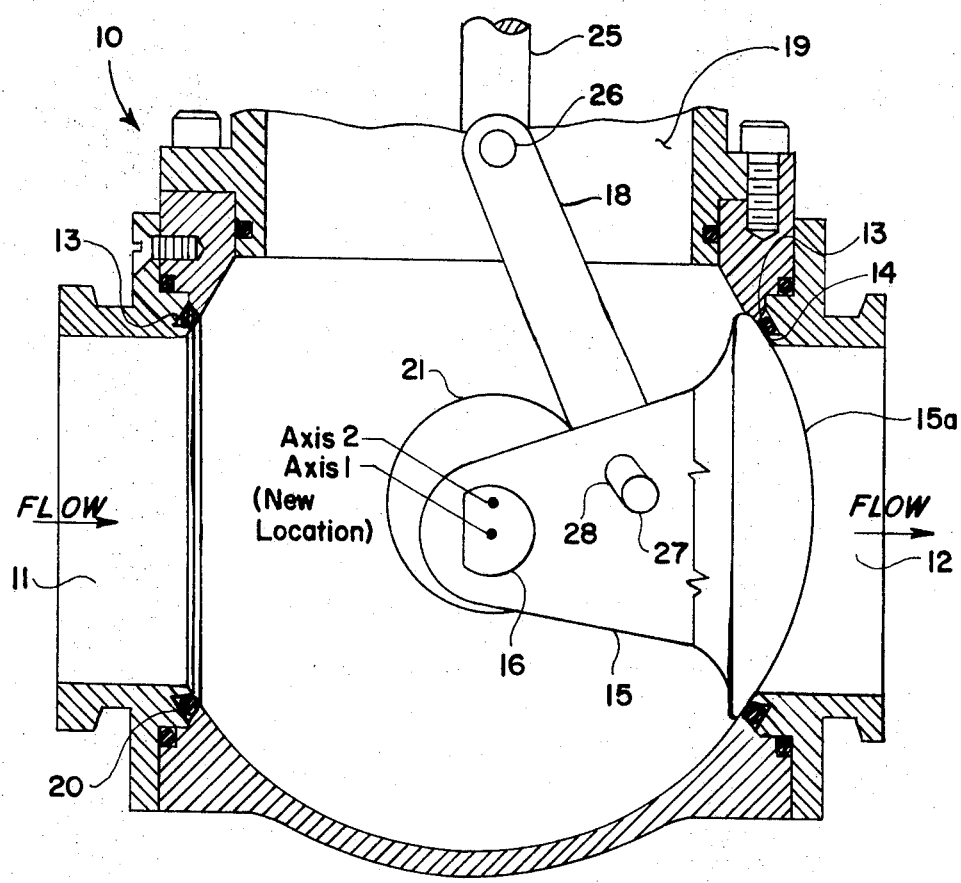
FIG. 3 is a partial cross-sectional front view of the lower portion of the valve showing the poppet closing the downstream port.

A locking mechanism is provided to lock bushing 21 in body 10 when poppet 15 is in the position shown in FIG. 1 and to thereafter lock journal pin 16 in fixed relationship to bushing 21 and to free the bushing when the poppet has moved from the position shown in FIG. 2 toward and including that shown in FIG. 3. This mechanism comprises a ball 37, a through cylindrical receiving hole 38 in the side of bushing 21, a conical recess 39 in body 10 adapted to partially receive the ball 37, and a spherically dished recess 40 in shaft 16 also adapted to partially receive the ball. In operation, when poppet 15 is in the position shown in FIG. 1, the ball is partially recessed in to the conical recess 39 in body 10 with its remainder in bushing receiving hole 38 and is retained there by the exposed solid side of shaft 16. Thus, rotation of bushing 21 is prevented as is clearly shown in FIG. 5. As poppet 15 moves to the "valve open" position shown in FIG. 2, however, ball 37 leaves recess 39 under the urging of the conical side of recess 39 and, moving through hole 38, enters recess 40 in journal 16 again leaving its remainder in hole 38. Thus, bushing 21 is now freed to rotate in body 10 but journal 16 becomes locked to bushing 21 and the two now must move together in body 10. As poppet 15 progresses from the closed (FIG. 1) position to the open (FIG. 2) position, pin 30, which is fixed in body 10, (see FIGS. 5 and 6) sweeps through 90° slot 32 in bushing 21 until it bears against face 31 of slot 32. Further rotation of journal 16 then causes pin 30 to move bushing 21 in a counterclockwise rotary manner producing the locking action described above and causing pin 34 (which is fixed in body 10) to sweep through arcuate slot 36 in bushing 21 until it strikes face 35 of slot 36 and further rotation of bushing 21 is prevented. Poppet 15 is then "reclosed" position shown in FIG. 3.

As will be seen from the various FIGS. and particularly in FIGS. 5, 6 and 7, the common center of rotation of journal 16 and poppet 15 (axis 1) is eccentrically located with respect to the center of rotation of bushing 21 (axis 2). Thus as poppet 15 moves from the position shown in FIG. 2 to that in FIG. 3, axis 1 is moved from its original position alongside of axis 2 to that indicated in FIG. 7 below axis 2. This relocation of these rotational axes results in proper alignment of the poppet with outlet 12 and seat 14 so that its spherical face seats correctly thereon despite the fact that axis 1 and axis 2 do not coincide with the radius of the spherical segment face of poppet 15 which would otherwise cause considerable misalignment and would in effect result in a valve which could only operate from the original closed position to the open position rather than be capable of reclosing the valve by seating on the opposite flow port.

If it is desired to reopen the valve, fluid pressure is vented from chamber 23 and is applied to chamber 22 forcing piston 24, rod 25 and link 18 downward and thus, through pin 27, causing poppet 15 to rotate 90° downwardly in a clockwise direction and away from seat 14 to allow flow to occur. Journal pin 16 is locked to bushing 21 during this action and rotation occurs about the central axis of bushing 21. When the actuator 17 is operated to its full travel, poppet 15 returns to the fully open position shown in FIG. 2 where it is down and substantially out of the flow path as shown. It should be noted that the difference in location of the rotational axis of poppet 15 and the axis of generation of the spherical face of poppet 15 results in movement of the face of poppet 15 away from seat 14 as it did with respect to seat 13 and the benefits of very little wiping or scraping of the poppet face across the seal are again realized.

If it is now desired to reclose the valve, fluid pressure is applied to chamber 23 thus forcing piston 24 upward and again rotating poppet 15 90° in a counterclockwise direction until it seats upon seat 14. Since journal pin 16 remains locked to bushing 21 during this action, the rotation again occurs about the central axis of bushing 21.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:

1. In a valve, a valve body having an inlet port and an outlet port, a poppet adapted to seat on either of said ports when aligned therewith, actuator means comprising a rod attached at one of its ends in articulated manner to an actuator piston and its other end pivotally attached to the poppet to move it selectively from onto and away from said ports, journal means associated with the poppet, a face on said poppet adapted to seat independently on each of said ports comprising a segment of a sphere the center of which is located below the axis of rotation of the journal means but lies in the same vertical plane therewith when the valve is seated on the inlet port, and means for relocating the central axis of the journal means and thus aligning the poppet with the outlet port.

2. The invention set forth in claim 1 with the pivotal attachment to the poppet comprising a pin in an elongated hole, whereby the pin is free to move off the dead center position should that occur.

3. In a valve, a valve body having an inlet port and an outlet port, a poppet adapted to seat on either of said ports when aligned therewith, actuator means associated with the poppet to move it selectively from onto and away from said ports, journal means associated with the poppet, a face on said poppet adapted to seat independently on each of said ports comprising a segment of a sphere the center of which is located below the axis of rotation of the journal means but lies in the same vertical plane therewith when the valve is seated on the inlet port, and means for relocating the central axis of the journal means including a bushing rotatably mounted in the body and eccentrically supporting the journal means, locking means preventing rotation of the bushing in the body during movement of the poppet from a position closing the inlet port to a fully open position, means freeing the locking means to allow rotation of the bushing during a period of movement of the poppet from the fully open position to a position closing the outlet port while simultaneously locking the journal means to the bushing, means to cause rotation of the bushing during the same period and means to stop the rotation thereof upon the closing of the outlet, whereby the axis of the journal means is relocated and brought into such alignment that the face of the poppet seats correctly on the outlet port.

4. The invention set forth in claim 3 with stop means including a pin fastened in the body and a shoulder on said bushing against which said pin strikes.

5. The invention set forth in claim 3 with the rotation of the bushing limited to 90°.

6. The invention set forth in claim 3 with the locking means comprising a free ball slidable in a cylindrical aperture in the periphery of the bushing, the aperture terminating at one end at the body and at the other end at the journal means recess means in the body and means in the journal to partially and alternatively receive the ball, and the ball being larger in diameter than the length of the aperture but smaller than the receiving depth of the recess plus the length of the aperture, whereby when the bushing is prevented from rotation in the body by the ball extending into the body recess, the journal is free to rotate in the bushing and when the journal is prevented from rotation in the bushing the bushing is free to rotate in the body.

7. The invention set forth in claim 6 with a drive pin fixedly attached to the journal means, an arcuate opening of 90° in the bushing through which the pin is adapted to pass, and a wall at each end of said opening adapted to be struck by said pin, whereby the bushing remains stationary until an end wall of said opening is in contact with and is urged to move by said pin.

8. The invention set forth in claim 4 with an arcuate opening in said bushing through which a stop pin fixedly attached to the body is adapted to pass, and a wall at each end of said second opening adapted to be struck by said pin, whereby the bushing can rotate only between the end walls until one or the other is struck by the pin.